June 15, 1965 J. Q. HUBBARD 3,189,854
COUPLING ARRANGEMENT
Filed April 20, 1962 3 Sheets-Sheet 1

INVENTOR:
John Q. Hubbard

Attorneys

INVENTOR:
John Q. Hubbard

Attorneys

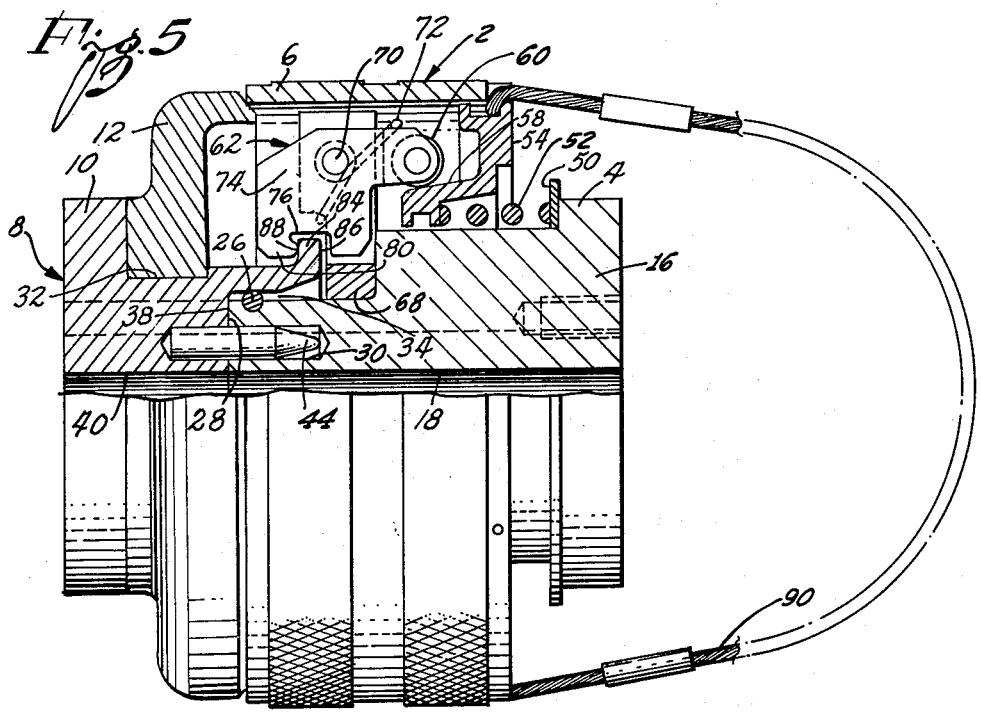
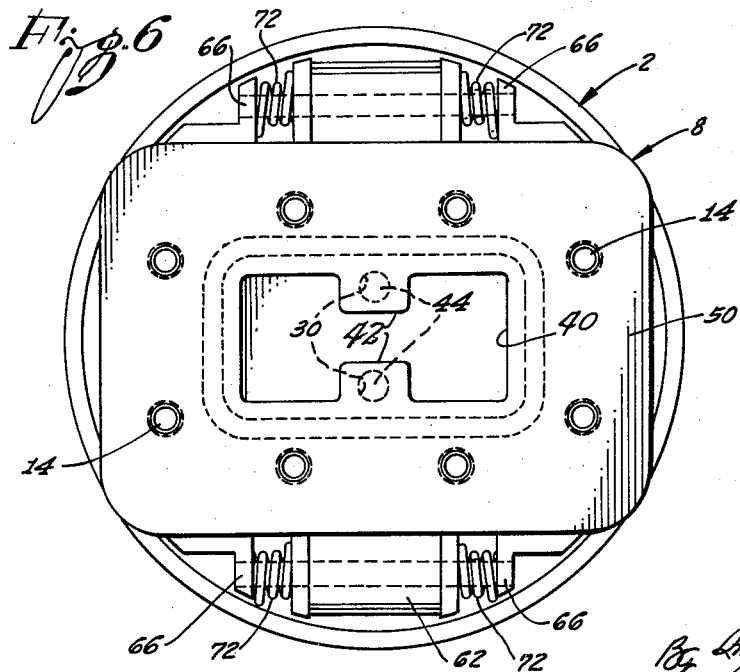

United States Patent Office 3,189,854
Patented June 15, 1965

3,189,854
COUPLING ARRANGEMENT
John Q. Hubbard, South Pasadena, Calif., assignor to Purolator Products, Inc., a corporation of Delaware
Filed Apr. 20, 1962, Ser. No. 189,002
9 Claims. (Cl. 333—98)

This invention relates to a quick-disconnect coupling arrangement having particular utility in applications which reasonably require relatively low force to accomplish coupler closure and opening but which develop a high degree of force on the coupling halves to assure intimate contact between the coupling assemblies.

While the disclosed invention may be utilized in many applications, it has particular utility in the area of high energy transmission and may encompass virtually all wave bands, however, the invention is illustrated in a preferred embodiment utilizing a double ridged, waveguide quick-disconnect coupling arrangement. The preferred embodiment has been found to give a high degree of desirable operation in frequency ranges of 4,750 to 11,000 mcs. and, in this area, offers a very desirable voltage standing wave ratio (VSWR) of less than 1.10 to 1, and in that range, is provided with a maximum attenuation of .05 decibel (db) at 500 watts power.

Those familiar with the art of high energy transmission will appreciate the fact that energy of this nature is frequently carried to the point of use via conduit arrangements. Due to the fact that the efficiency of the energy transmission is a function of the conduit configuration, and is influenced by the continuity of that configuration at joinder points in the conduit. Obviously, a practical installation in aircraft or the like prevents the use of continuously formed conduit from the point of energy generation to the point of energy use. The physical requirements of assembly to the aircraft prevent such continuity. Accordingly, coupling arrangements must be provided and heretofore the efficiency of energy transmission dictated that such arrangements employ bolted connections. It was found that the connections require an intimacy of joinder of coupling sections as well as conduit configuration alignment which could only be achieved by the use of bolted connections whereby large amounts of force could be employed at the coupling. The assembly and disassembly requirements of such arrangements have been a constant source of difficulty to the installers and users of related equipment. For example, if the particular energy transmission line were installed in a high altitude aircraft, the disconnect difficulty of operating personnel at high altitudes is patent. Ambient conditions at elevated altitudes require cumbersome dress by the aircraft personnel. The disassembly of the relatively small multi-bolted flanges under these conditions is obvious. Additionally, original installation during aircraft manufacture has been found to be time consuming and wasteful. Nevertheless, these difficulties have become an accepted practice in the trade because of the dictates of transmission efficiencies.

With the above in mind, it will be understood that the present invention comprehends a quick-disconnect coupling which is subject to ready open and closure by the application of relatively minor forces by operating personnel, yet which, nevertheless, develops on coupling closure a high level of force application to the mating assemblies which results in proper conduit alignment and intimate coupling mating. This functional accomplishment is desired and necessary in meeting energy transmission requirements at this level, yet eliminates the disadvantages associated with the arrangements heretofore used.

These and other advantages of the invention will be more clearly understood by reference to the following specification and to the associated drawings, wherein:

FIGURE 5 is a side elevational view, partially in section, illustrating a coupler assembly in closed position; and FIGURE 6 is an end elevational view taken from the left of the structure shown in FIGURE 5.

Figure 1:
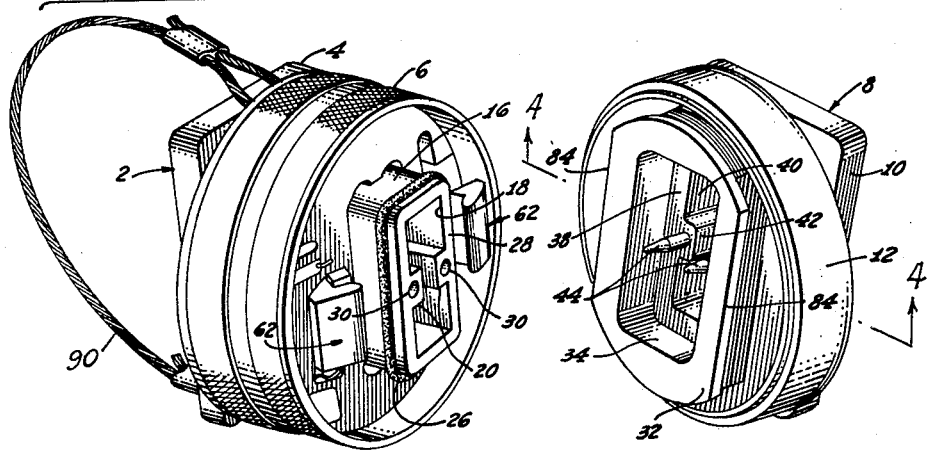
FIGURE 1 is a perspective view of the coupler assemblies prior to closure.
Figure 2:
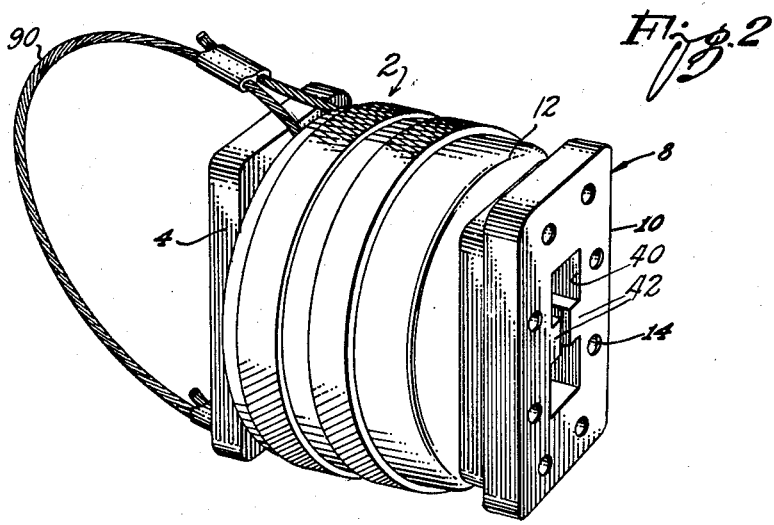
FIGURE 2 is a perspective view of the assemblies in closed condition.

Describing the invention in detail, attention is initially directed to FIGURES 1 and 2. The numeral 2 generally indicates a receptacle assembly, said receptacle assembly comprising a base plate 4 and an annular housing element 6 mounted to the base plate 4 and peripherally surrounding the central portion of the coupler receptacle assembly. A plug assembly is indicated generally at 8 and comprises a base plate 10 having securely mounted thereon an annular housing wall 12 which peripherally surrounds the central portion of the plug assembly and is arranged for interfitting relationship with the annular housing 6. The base plates 4 and 10 are provided with a plurality of mounting holes 14 whereby they may be securely associated with related parts of the conduit transmission line (not shown).

Figure 3:
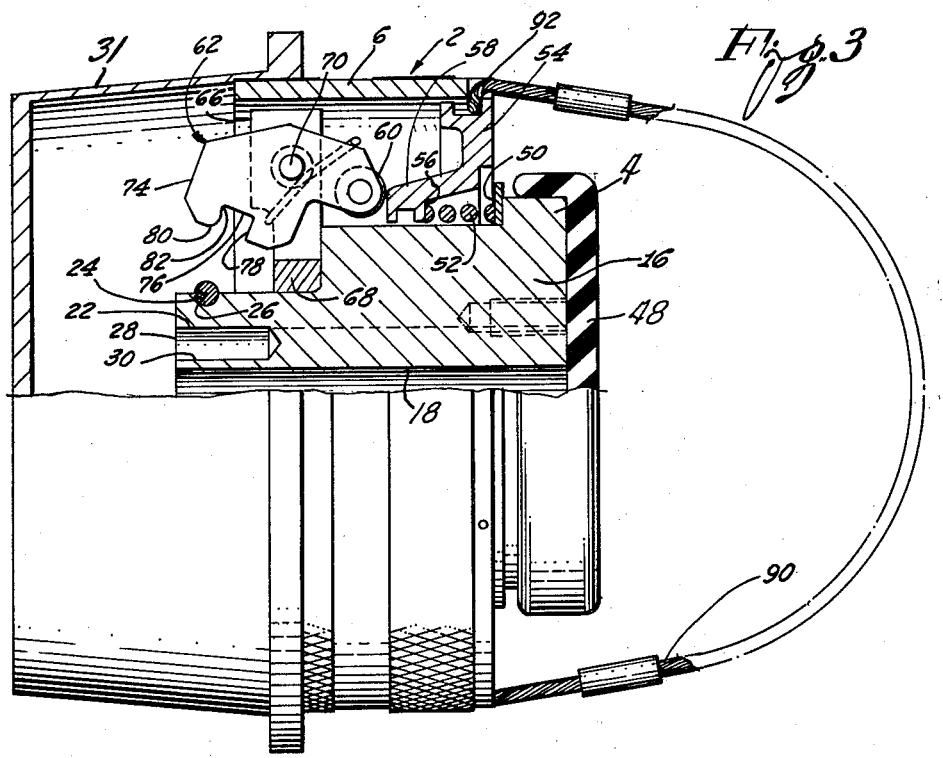
FIGURE 3 is a side elevational view, partially in section, of the receptacle assembly of the coupler arrangement.

Directing attention to FIGURE 3, it will be seen that the receptacle assembly 2 comprises a base member 16 which may be tubular in form and which defines centrally thereof an appropriately designed wave guide channel 18. It will be understood that the configuration of the waveguide channel is generally determined by the frequency of the energy to be transmitted and that various chamber designs may be employed, depending upon the particular transmission requirements of a given application. In the illustrated embodiment, the channel 18 has two opposite inner longitudinal ribs or ridges 20, 20 which, together with the general configuration shown, provides a high degree of transmission efficiency in the frequency range heretofore mentioned. The base member 16 is provided with a forwardly-projecting portion 22 having an annular groove 24 thereon for reception of a peripheral seal element 26. The forward portion of the base member 16 is terminated by a generally planar face 28, said face 28, in the preferred embodiment, being machined to a high degree of surface smoothness. The base member 16 is additionally provided with a pair of aligned sockets or apertures 30, 30 said apertures 30 being of precise dimension and being accurately located in determined relation to the general transverse configuration of the cavity 18. Up to the time of actual use the receptacle assembly 2 may be protected by a suitable removable cap 3 as shown in FIG. 3.

Figure 4:
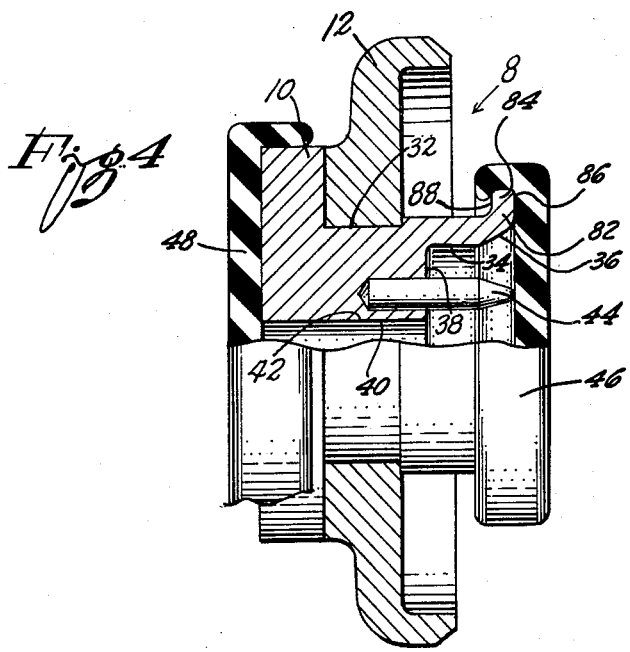
FIGURE 4 is a side elevational view, partially in section along the line 4—4 of FIG. 1, of the plug assembly of the coupler arrangement.

As may be seen in FIG. 1, the plug assembly 8, in addition to the structure heretofore described, has a forwardly-projecting position 32 defining a central cavity 34 therein, said central cavity having a general configuration conforming to the peripheral outline of the base member 16 on the receptacle assembly. The cavity 34 is further characterized by outwardly tapering section 36 and transverse shoulder or abutment 38. The portion 32 of the plug assembly 8 further delineates a transmission channel 40 which, in turn, is congruently formed to the configuration of the transmission channel 18 of the receptacle assembly. Again, as shown in FIG. 1 waveguide ribs or ridges 42, 42 further define the transmission channel 40. The ridges 42 are each provided with appropriate tapered nosed aligning pins 44, 44, it being understood that the aligning pins project forwardly from the wall 38 and are precisely located with reference to the general configuration of the transmission channel 40 and also with reference to the receiving apertures 30, 30 of the receptacle assembly 16. In the disassembled view of the plug assembly shown in FIGURE 4, it will be understood that the transmission channel 40 may be protected during storage and shipment by appropriate flexible sealing caps 46 and 48 which are mounted on opposed ends of the plug assembly 8 and which may be removed prior to installation of the connector arrangement.

Returning to the receptacle assembly 2, it will be understood that the base member 16 has provided thereon an annular shoulder 50, said annular shoulder serving as an abutment to receive one end of an annular coiled spring 52 which is positioned to surround the base member 16 and be movably mounted thereon. The receptacle assembly 2 further includes a wedge collar 54, or cam collar which may be termed a locking means and which has an inner annular abutting surface 56 which is pressure-engaged by the adjacent end of the coil spring 52. In addition, the wedge collar 54 is provided with an outwardly and rearwardly tapering wedge surface or cam surface 58, the latter being operatively positioned adjacent a pair of followers in the form of rollers 60 which, in turn, are pivotally carried by the arms respectively of a pair of clamp levers indicated generally at 62.

Two pairs of mounting lugs 66 (FIG. 3) secured as at 68 (FIG. 3) in any conventional manner to the base member 16 and project therefrom to provide journalled mounting for a corresponding pair of pins 70 which, in turn, serve as pivots for the two clamp levers 62, respectively. While, in the preferred embodiment, only two clamp levers 62 are illustrated, it will be understood that any number may be employed depending upon the requirements of a given design and limited only by the physical area available on the receptacle assembly.

As shown in FIGS. 5 and 6, each of the clamp levers 62 is provided with a pair of spaced torque springs 72, 72, the latter surrounding the corresponding pivot 70 and having opposed ends in locking relationship with the spaced abutments 66 and the centrally located clamping lever 62 to normally bias the roller 60 toward the base body 16. Thus the torque springs 72 exert force to urge the two clamp levers 62 towards their release positions, FIG. 3 showing one of the two clamp levers in its released position.

As best shown in FIG. 3, each lever 62 further has a forwardly-projecting portion 74 defining on its radially inner side a slot 76, said slot 76 being defined by a forwardly-facing shoulder 78 on one side thereof and a rearwardly-facing shoulder 80 on the other or forwardly side thereof. The rearwardly-facing shoulder 80 is undercut as indicated at 82.

Recalling that the springs 72 maintain the two clamp levers 62 in open position, illustrated in FIGURE 3, prior to closure at the coupling, it will be understood that the plug assembly 8 with the protective cap 46 removed therefrom, may be manually brought into alignment with the base segment 16 of the receptacle assembly, as may be understood by reference to FIG. 5. In this position, the base segment 16 telescopes within the flared cavity 34 of the plug assembly 8. The forwardly projecting portion 32 of the plug assembly 8 is formed with a peripheral flange 84 forming a forwardly-facing shoulder 86 and a rearwardly-facing shoulder 88. It will thus be understood that upon closure of the plug assembly and receptacle assembly, the forwardly-facing shoulder 86 of the flange 84 engages the forwardly-facing shoulders 78 of the two clamp levers 62 and continued closure motion of the respective assemblies induces the two clamp levers 62 to pivot about the corresponding pins 70. With this in mind, it will be understood that the closure force required is only that amount of force sufficient to overcome the normal biasing action of the springs 72, which, it will be understood, is a relatively light force application. As closure of the assembly is continued, the resulting rotation of the two clamp levers 62 induces the rearwardly-facing shoulders 80 of the two clamp levers to be brought into engagement with the rearwardly-facing shoulder 88 of the flange 84. Additionally, the rotation of the two clamp levers 62 biases the rollers 60 of the clamp levers upwardly and out of blocking engagement with the forwardly-facing edge of the wedge collar device 54. It will thus be understood that the wedge collar device 54, and particularly the wedge surface 58 thereof, is urged by the action of the spring 52 into underlying pressured engagement with the two rollers 60, which by virtue of the wedge surface 58 and the axial pressure of the spring 52, induces forceful rotation of the clamp levers 62 about the pins 70. In this manner, the plug assembly 8 is brought into closed relation with the receptacle assembly 2 as is clearly shown in FIGURE 5.

As an additional feature of the closing action just recited, it will also be understood that the guide pins 44 are received within the respective apertures 30 and serve to bring the energy transmitting channel 40 into proper and precise, congruently aligned relationship with the energy transmitting channel 18. After closure, the spring 52 continues to urge the wedge collar 54 forwardly, exerting, by virtue of the wedge surface 58, continuous pressure upwardly against the rollers 60, thus maintaining pivoting or clamping pressure on the two clamp levers 62, and through the rearwardly facing shoulder 80 and against the rear shoulder 88 of the flange 84 of the plug assembly 8. In this manner, and by virtue of the mechanical advantage employed, extremely high pressure forces urge the respective assemblies into intimate, tight engagement and particularly the mating surfaces 28 and 38 are brought into close, continuously pressured engagement.

Recalling that the efficiency of energy transmission is a function not only of the alignment of the respective transmission cavities in the respective assemblies, but also the intimacy of the engagement and closure between the two assemblies and particularly the channel defining joining surfaces, it will be understood that as a result of the structure heretofore described, a continuous transmission conduit is provided through the coupling which offers the highly advantageous and extremely low V.S.W.R. that was heretofore only achievable by virtue of the use of bolted connections. This highly desirable result is achieved even though closure of the respective coupling assemblies may be easily and quickly accomplished.

To provide quick manual disconnect of the respective assemblies, a lanyard 90 is provided, said lanyard being secured at opposed points to the wedge collar 54 as at 92. When it is desired to disconnect the assembly, a retracting pressure is exerted on the lanyard 90 which induces a rearward motion of the wedge collar 54 along the base body 16 compressing the spring 52 and retracting the wedge collar 54. As the wedge collar 54 has been retracted to the position shown in FIGURE 3, the rotary biasing effect of the springs 72 induce opening motion of the two clamp levers 62 releasing the clamp levers and particularly the rearwardly facing shoulder 80 from locking engagement with the cooperating flange 84 of the plug assembly 8. It is to be noted that when the lanyard is actuated to retract the wedge collar 54 to free the two clamp levers, the release rotation of the two clamp levers by the torque springs 72 cause the forwardly-facing shoulders 78 of the two clamp levers to exert pressure against the forwardly-facing shoulder 86 of the plug assembly whereby the two springs exert separation force between the two assemblies. Thus, the plug assembly 8 may be easily withdrawn from the receptacle assembly 2.

Thus, it will be understood that the device as illustrated eliminates the time consuming and difficult task of original assembly and subsequent dis-assembly of the bolted flange devices heretofore required in connections of this type and further the device provides the unique result of affording the ease of a closure and opening while maintaining the desired level or degree of energy transmission efficiency necessary for the operation of this type of system.

The invention as shown is by way of illustration and not limitation and may be modified without departing from the scope of the appended claims.

I claim:

1. In a double ridged waveguide coupling arrangement, a receptacle assembly comprising:
   a central segment-defining, energy-transmitting channel of determined configuration,
   a plurality of inwardly-projecting, opposed ridges in said channel,
   apertures in said ridges extending longitudinally of the receptacle assembly,
   said central segment having a forwardly-projecting planar surface immediately surrounding said channel,
   a plug assembly comprising a central member defining a channel having a configuration congruently complementing the configuration of said first mentioned channel,
   a pair of opposed inwardly-projecting ridges in said second mentioned channel,
   said ridges receiving a pair of forwardly-projecting aligning pins,
   said member having a forwardly-projecting surface immediately surrounding said second mentioned channel,
   said pins being receivable in said longitudinal apertures during closure of the assembly to effectuate precise alignment of the respective channels and ridges,
   shoulder means on one of said assemblies,
   clamp means on the other of said assemblies,
   said clamp means comprising at least one lever pivotally mounted on the other of said assemblies and having at one end thereof a slot operable to receive said shoulder means during closure of said assemblies,
   the slot in said lever being defined at one edge thereof by a pressure-applying portion of the lever,
   a follower abutment at the other end of the lever,
   and spring loaded cam means movably mounted on said other assembly and engageable with said follower abutment to induce pressured movement of the lever and pressure-engagement of said portion with said shoulder means to drive the respective assemblies together and bring the respective surfaces into intimate engagement with each other.

2. A double ridged waveguide coupling arrangement according to claim 1,
   and including lanyard means secured to said cam means to accommodate manual retraction of the cam means from said pressured engagement with said follower abutment.

3. A double ridged waveguide coupling arrangement according to claim 2,
   and including spring means associated with said lever and operative to bias said lever in a direction bringing said slot out of engagement with said shoulder means.

4. In a coupling having a passage therethrough, the combination of:
   a first coupling assembly defining a portion of the passage and formed with both a forwardly-facing shoulder and a rearwardly-facing shoulder;
   a second coupling assembly shaped to complement the first assembly and defining the rest of the passage, the two assemblies being movable axially into mating relation;
   a clamp lever pivotally mounted on the second assembly to rotate from a normal retracted position to an effective position into engagement with said rearwardly-facing shoulder to hold the two assemblies together,
   the clamp lever being in the path of axial movement of the forwardly-facing shoulder of the first assembly to be rotated by the forwardly-facing shoulder from its retracted position to its effective position into engagement with the rearwardly-facing shoulder of the first assembly when the two assemblies are moved into mating relation;
   means to releasably lock the clamp lever in its effective position in response to rotation of the clamp lever to its effective position, said locking means being manually retractable to release the clamp lever; and
   yielding means to urge rotation of the clamp lever to its normal retracted position thereby to cause the clamp lever to press against the forwardly-facing shoulder of the first assembly to create separation force between the two assemblies when the locking means releases the clamp lever.

5. A combination as set forth in claim 4 in which said locking means is movable between a retracted release position and a locking position;
   in which spring means is provided to urge the locking means to its locking position;
   in which the clamp lever at its normal retracted position blocks the path of movement of the locking means out of its retracted position; and
   in which the clamp lever at its effective position clears the path of the locking means to permit the spring means to move the locking means to its locking position.

6. A combination as set forth in claim 5 in which said locking means is a wedge member for wedging action against the clamp lever to cause the clamp lever to press continuously against said rearwardly facing shoulder of the first assembly to press the two assemblies together.

7. In a coupling having a passage therethrough, the combination of:
   a first coupling assembly defining a portion of the passage and formed with a rearwardly-facing shoulder;
   a second coupling assembly shaped to mate with the first assembly and defining the rest of the passage;
   a clamp lever pivotally mounted on the second assembly to rotate from a retracted position to an effective position,
   the clamp lever having a clamp arm and a control arm, the clamp arm having a rearwardly-facing shoulder to engage the rearwardly-facing shoulder of the first assembly at the effective position of the clamp lever to hold the two assemblies together;
   a locking member movable along a predetermined path from a retracted position to a position engaging the control arm to prevent release rotation of the clamp lever when the clamp lever is in its effective position,
   the control arm clearing said path when the clamp lever is in its effective position but intersecting the path to hold the locking member in its retracted position when the clamp lever is in its retracted position; and
   yielding means urging the locking member towards its locking position whereby the locking member moves to its locking position in response to rotation of the clamp lever from its retracted position to its effective position, the locking member being manually retractable against the resistance of the yielding means.

8. A combination as set forth in claim 7 in which said locking member is a wedge to exert continuous pressure on the control arm thereby to cause the clamp lever to exert continuous pressure on said rearwardly facing shoulder to press the two assemblies together when the clamp lever is in its effective position.

9. A combination as set forth in claim 8 in which rolling means is mounted on said control arm for rolling contact with said wedge.

References Cited by the Examiner
UNITED STATES PATENTS

| 2,409,650 | 10/46 | Wiggins | 339—91 |
| 2,510,477 | 6/50 | Montgomery | 285—320 X |
| 2,521,701 | 9/50 | Earle et al. | 339—91 |
| 2,675,254 | 4/54 | Davis et al. | 285—320 X |
| 2,735,993 | 2/56 | Humphrey | 333—91 |
| 2,788,498 | 4/57 | Hardaway | 333—98 |
| 2,830,830 | 4/58 | Jacobs et al. | 285—320 X |
| 2,877,437 | 3/59 | Flanagan | 333—91 |

HERMAN KARL SAALBACH, *Primary Examiner*.